United States Patent
Naritomi (10) Patent No.: US 8,031,289 B2
(45) Date of Patent: Oct. 4, 2011

(54) OPTICAL SHEET RETAINING TOOL AND CHASSIS FOR LIQUID CRYSTAL DISPLAY DEVICE

(75) Inventor: Masanori Naritomi, Tokyo (JP)

(73) Assignee: Taisei Plas Co., Ltd., Tokyo (JP)

( * ) Notice: Subject to any disclaimer, the term of this patent is extended or adjusted under 35 U.S.C. 154(b) by 489 days.

(21) Appl. No.: 12/067,861

(22) PCT Filed: Sep. 19, 2006

(86) PCT No.: PCT/JP2006/318515
§ 371 (c)(1), (2), (4) Date: Apr. 2, 2009

(87) PCT Pub. No.: WO2007/034786
PCT Pub. Date: Mar. 29, 2007

(65) Prior Publication Data
US 2010/0045888 A1 Feb. 25, 2010

(30) Foreign Application Priority Data

Sep. 22, 2005 (JP) ................................ 2005-275133
Dec. 16, 2005 (JP) ................................ 2005-362959
Feb. 23, 2006 (JP) ................................ 2006-046155

(51) Int. Cl.
*G02F 1/1333* (2006.01)
*G02F 1/13357* (2006.01)

(52) U.S. Cl. ............................. 349/58; 349/60; 362/97.2

(58) Field of Classification Search .................... 349/58, 349/60
See application file for complete search history.

(56) References Cited

U.S. PATENT DOCUMENTS

| 6,552,761 | B1* | 4/2003 | Seo et al. ......................... 349/58 |
| 7,864,261 | B2* | 1/2011 | Chen et al. ....................... 349/58 |
| 7,927,004 | B2* | 4/2011 | Murakami et al. ............. 362/633 |
| 2002/0080298 | A1* | 6/2002 | Fukayama ....................... 349/58 |

(Continued)

FOREIGN PATENT DOCUMENTS

JP  4-33076 U  3/1992

(Continued)

OTHER PUBLICATIONS

International Search Report of PCT/JP2006/318515, date of mailing Dec. 26, 2006.

*Primary Examiner* — Michelle R Connelly Cushwa
(74) *Attorney, Agent, or Firm* — Westerman, Hattori, Daniels & Adrian, LLP (57) ABSTRACT

An optical sheet retaining tool for a liquid crystal display device that has a simple structure and low cost, wherein assembling and disassembling can be performed easily. The optical sheet retaining tool includes a first retaining piece 21 having a first retaining part 211 made of a soft material for retaining an optical sheet 13, a second retaining piece 22 having a second retaining part 221 made of a soft material opposed to and cooperating with the first retaining part for gripping and retaining the optical sheet, a latching section 24 for latching the first and second retaining parts with the optical sheet gripped therebetween, a fixing section 24 for retaining and fixing the first and second retaining pieces to a chassis 1, and a bearing section 23 disposed on at least one of the first and second retaining pieces for gripping the optical sheet.

13 Claims, 8 Drawing Sheets

U.S. PATENT DOCUMENTS

| | | | |
|---|---|---|---|
| 2002/0149712 A1* | 10/2002 | Kitamura et al. | 349/58 |
| 2004/0109308 A1* | 6/2004 | Ho | 362/97 |
| 2004/0246397 A1* | 12/2004 | Kang et al. | 349/58 |
| 2005/0151894 A1* | 7/2005 | Katsuda et al. | 349/58 |
| 2005/0219438 A1* | 10/2005 | Park | 349/58 |
| 2005/0231659 A1* | 10/2005 | Lee | 349/58 |
| 2005/0243238 A1* | 11/2005 | Cha et al. | 349/58 |
| 2006/0171164 A1 | 8/2006 | Kida | |
| 2007/0109461 A1* | 5/2007 | Park | 349/58 |
| 2007/0127270 A1* | 6/2007 | Chang | 362/633 |
| 2009/0128730 A1* | 5/2009 | Hsu et al. | 349/58 |
| 2011/0122335 A1* | 5/2011 | Tsubokura et al. | 349/60 |

FOREIGN PATENT DOCUMENTS

JP    2004-219926 A    8/2004

* cited by examiner

OPTICAL SHEET RETAINING TOOL AND CHASSIS FOR LIQUID CRYSTAL DISPLAY DEVICE

TECHNICAL FIELD

The present invention relates to a retaining tool for fixing and retaining an optical sheet on a chassis, which is used in a backlit type of liquid crystal display device for a large-scale liquid crystal television apparatus or the like. More specifically, the invention concerns an optical sheet retaining tool for a liquid crystal display device, which is simple in structure, while enabling assembly and disassembly of the display device to be performed with ease.

BACKGROUND ART

Optical sheets, such as light diffusion sheets, prism sheets, polarizing sheets or the like, are used in backlit type liquid crystal display devices for large-scale liquid crystal television apparatus and the like. However, until the present time, for fixing and retaining these types of optical sheets on a chassis of the display device, individualized fixing structures have been designed and manufactured respectively for each type of display device. Further, operations for fixing and retaining such optical sheets, as well as for removing the optical sheets for carrying out repairs and the like, have involved different complex operations for each type of machine.

As one fixing structure for optical sheets, as disclosed in the following Patent Document 1, a surface light source device is known. Patent Document 1 discloses that a frame is assembled integrally around the periphery of a light transmission plate having fluorescent lamps mounted on both side surfaces thereof. A prism sheet, a diffusion sheet, and a reflective sheet are prepared in a stacked condition, corresponding to front and rear parts of the light transmission plate, and fixing and retention thereof is carried out by engaging projections on the side of the light transmission plate, and engaging recesses on the side of the frame.

Further, the chassis of a large scale flat display device such as a large-scale liquid crystal television apparatus or the like previously has been manufactured by a sheet metal punching process or a press formation process. However, when a large-scale screen chassis is used, a large sized sheet metal material must be used as well, and a core that is made by punching the central region of the sheet metal material is also rendered large in size in proportion thereto. The core is treated as unnecessary scrap material, which is created upon manufacturing the chassis. However, the creation itself of such large scale scrap material is problematic in terms of material costs, and further, there are problems in that costs must be expended on the handling and processing of such scrap material.

Further, a panel type display device such as disclosed in the below mentioned Patent Document 2 also is known. Patent Document 2 discloses a construction for a rectangular frame by assembling together four square-shaped steel tubes. Connection of the square-shaped steel tubes is performed by welding or fixing with screws.

Patent Document 1: Japanese Laid-Open Patent Publication No. 10-255533

Patent Document 2: Japanese Laid-Open Patent Publication No. 2000-92415

Formerly, the fixing structure for optical sheets has been different for each type of display apparatus, and a retaining tool for optical sheets, which can be used in a general or all-purpose manner, has not existed. With such a structure, the costs for the display apparatus cannot be reduced, and further, upon assembling and disassembling the apparatus, the content of the work operations differ for each machine type, and thus are complicated.

Further, in the case of manufacturing the chassis of a large scale flat panel display device as in the prior art, by a sheet metal punching process or a press formation process, there are problems of costs associated with the handling and processing of scrap materials, and thus there have been problems in that manufacturing costs cannot be reduced. Moreover, even with the chassis disclosed in Patent Document 2, in which square-shaped steel tubes are connected, the connecting process cannot be applied to mass production, and thus problems have resulted in that manufacturing costs cannot be reduced.

DISCLOSURE OF THE INVENTION

Consequently, the present invention has the object of providing an optical sheet retaining tool for a liquid crystal display device, which is simple in structure and low in cost, and further for which assembly and disassembly operations of the display device can be carried out easily.

Further, another object of the invention is to provide a chassis for a liquid crystal display device, in which, by applying a technique whereby a metallic structure and a thermoplastic resin are integrated, a lightweight and high strength chassis frame for a large-scale flat panel display device can be manufactured from materials with good efficiency, and further, in which the liquid crystal display device chassis is low in cost and suited to mass production.

To achieve the aforementioned objects, an optical sheet retaining tool for a liquid crystal display device includes a first retaining piece having a first retaining part made of a soft material for retaining an optical sheet for a liquid crystal display device, a second retaining piece having a second retaining part made of a soft material capable of being arranged in opposition to the first retaining part, for gripping and retaining the optical sheet in cooperation with the first retaining part, a latching section for latching the first retaining part and the second retaining part under a state in which the optical sheet is gripped therebetween, a fixing section for retaining and fixing the first retaining piece and the second retaining piece to a chassis of the liquid crystal display device, and a bearing section disposed on at least one of the first retaining piece and the second retaining piece, and serving as a bearing for gripping the optical sheet.

Further, in the aforementioned optical sheet retaining tool for a liquid crystal display device, preferably, the bearing section is made up from an elastomer that mutually connects the first retaining piece and the second retaining piece together.

Further, in the aforementioned optical sheet retaining tool for a liquid crystal display device, preferably, the bearing section comprises a projection formed on at least one of the first retaining piece and the second retaining piece.

Further, in the aforementioned optical sheet retaining tool for a liquid crystal display device, preferably, the latching section and the fixing section are formed as a single latching and fixing section.

Further, in the aforementioned optical sheet retaining tool for a liquid crystal display device, preferably, the first retaining part and the second retaining part are formed from an elastomer.

Further, in the aforementioned optical sheet retaining tool for a liquid crystal display device, preferably, a stopper is included, which maintains an interval between the first retaining piece and the second retaining piece at an appropriate value for retaining the optical sheet.

Further, in the aforementioned optical sheet retaining tool for a liquid crystal display device, preferably, the optical sheet comprises a laminated stack having a plurality of layers, and one or more layers are excluded from being gripped by the first retaining part and the second retaining part.

Further, in the aforementioned optical sheet retaining tool for a liquid crystal display device, preferably, the layer that is excluded from gripping of the optical sheet is anchored onto either the first retaining piece or the second retaining piece.

Further, a chassis for a liquid crystal display device of the present invention comprises a chassis frame onto which the aforementioned optical sheet retaining tool for a liquid crystal display device is assembled, the chassis frame being manufactured by a step of forming metal frame members, forming four sides of a substantially rectangular shaped chassis frame, a surface treatment step in which a surface treatment is performed on surfaces at least in the vicinity of adjoining portions of the frame members, to thereby form a plurality of fine recesses therein and create adjoining surfaces, and an injection bonding step of placing four of the frame members mutually in contact with or in close proximity to each other so as to be arranged in the shape of the chassis frame, and injecting a thermoplastic resin onto the adjoining surfaces over two of the frame members, which have been brought into contact or placed in close proximity, on respective joined parts thereof, thereby coupling four of the frame members integrally to form the chassis frame.

Further, in the aforementioned chassis for a liquid crystal display device, preferably, in the surface treatment step, the frame members are immersed in a corrosive liquid and etching is performed thereon, and surface treatment is carried out such that an average inside diameter of the fine recesses is within a range of 10 to 80 nm.

Further, in the aforementioned chassis for a liquid crystal display device, preferably, the thermoplastic resin used in the injection bonding step is a resin made up primarily of polybutylene terephthalate or polyphenylene sulfide.

Further, in the aforementioned chassis for a liquid crystal display device, preferably, in the injection bonding step, the frame members are inserted into an injection forming mold, and the thermoplastic resin is injected onto the adjoining surfaces to perform joining thereof.

Further, in the aforementioned chassis for a liquid crystal display device, preferably, the frame members are composed of an aluminum alloy.

The present invention, owing to the configuration thereof described above, offers the following effects.

By means of the retaining tool made up of the first retaining piece and the second retaining piece, the optical sheet can be retained evenly by an appropriate and even gripping force. The retaining operation of the optical sheet by the retaining tool is easily carried out, merely by sandwiching the optical sheet between the first retaining part and the second retaining part and pressing the retaining tool against the chassis. Further, the operation to remove the optical sheet also can be performed easily by releasing the engagement between the chassis and a latch on the end of the fixing section. Furthermore, the structure of the retaining tool is both simple and low in cost.

Because the bearing section is made of an elastomer that mutually connects the first retaining piece and the second retaining piece, the retaining tool is connected by a single element and handling thereof is simple. Further, insofar as the first retaining piece and the second retaining piece are rotated about the bearing section, operations for assembling and disassembling the optical sheet are simplified.

In the event that the bearing section comprises a projection, which is formed on at least one of the first retaining piece and the second retaining piece, the structure of the retaining tool is further simplified and costs for the retaining tool can be further reduced.

When the latching section and the fixing section are formed one in the same as an integrated latching and fixing section, the structure of the retaining tool is further simplified and costs for the retaining tool can be further reduced.

Because the first retaining part and the second retaining part are formed from an elastomer, an excessive gripping force does not act on the optical sheet, and reliable retention thereof with a high frictional force can be carried out at a suitable gripping force.

Because a stopper is provided on the retaining tool, an interval between the first retaining piece and the second retaining piece is maintained at an appropriate value, and the optical sheet can be retained reliably by a suitable gripping force.

The optical sheet comprises a laminated stack having plural layers. Even if the mechanical strength of one of the layers is considerably weaker than the other layers, by gripping the optical sheet while excluding the one layer, the optical sheet can be retained at a sufficient retention force, and an adequate tensile force is imparted to the optical sheet, so that the flatness thereof can be improved.

By anchoring the layer that is excluded from gripping onto either one of the first retaining piece and the second retaining piece, a sufficient tensile force can be imparted to the layer that is excluded from gripping.

Because the chassis frame is manufactured by integrally joining the metallic frame member forming four sides, extraneous material parts are significantly reduced, and material costs, costs associated with disposing of scrap materials, and manufacturing costs for the chassis can be significantly reduced. Further, because the frame materials are joined together integrally by injection molding using a die assembly, it is possible to carry out mass production, and thus manufacturing costs can be even further reduced.

Because a surface treatment is carried out on the adjoining surfaces by immersing the frame members in a corrosive liquid and performing etching thereon, the process for forming the plurality of fine recesses can be easily conducted. Further, when the surface treatment of the adjoining surfaces is carried out such that an average inside diameter of the fine recesses is within a range of 10 to 80 nm, the bonding strength of the metal material and the thermoplastic resin can be increased maximally.

By making the thermoplastic resin a crystalline resin, the bonding strength between the metal material and the thermoplastic resin can be increased. As a crystalline thermoplastic resin, a resin made up primarily of polybutylene terephthalate or polyphenylene sulfide can be used.

Because the frame members are inserted into an injection forming mold, and the thermoplastic resin is injected onto the adjoining surfaces to perform joining thereof, mass production is facilitated and manufacturing costs can be reduced.

In the event that the frame members are composed of an aluminum alloy, the frame members are both lightweight and corrosion resistant, and a chassis frame exhibiting a strong bonding strength with the thermoplastic resin can be manufactured at low cost.

EXPLANATION OF REFERENCE CHARACTERS 1 chassis
2, 2a, 3, 4, 5 retaining tool
6, 7 die assembly
11 supporting members
12 backlight
13 optical sheet
14 liquid crystal display panel
21, 31, 41, 51 first retaining piece
22, 32, 42, 52 second retaining piece
23, 33, 43, 53 bearing section
24 latching and fixing section
25 through hole
26, 36 stopper
34 fixing member
44, 54 latching and fixing pin
102 chassis frame
103 beam member
110 chassis
111 chassis frame
112 beam member
120 extruded section
121, 122, 123, 124 frame members
125 thermoplastic resin
126 adjoining surface
131 light diffusing sheet
132 prism sheet
133 polarizing sheet
211, 311, 411, 511 first retaining part
221, 321, 421, 521 second retaining part
312 first latching member
322 second latching member

BEST MODE FOR CARRYING OUT THE INVENTION

Figure 1:
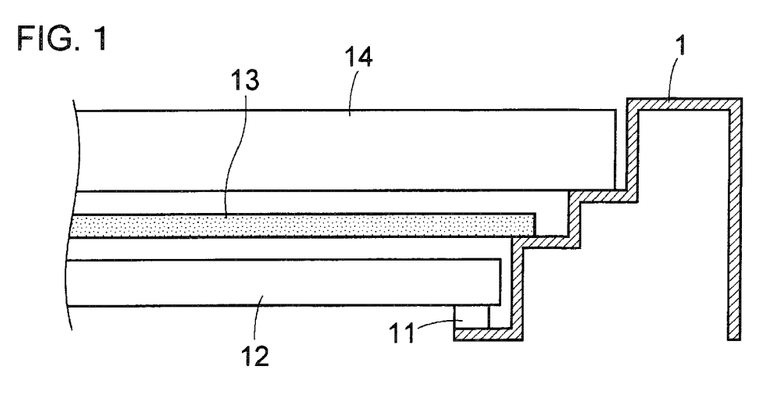
FIG. 1 is a view showing an anchored state of a chassis 1 of a liquid crystal display device.

An embodiment of the present invention will be described below with reference to the figures. FIG. 1 is a view showing an anchored state of a chassis 1 of a liquid crystal display device. FIG. 1 shows a cross sectional view cut across a plane perpendicular to the display screen. A backlight 12 made up of fluorescent tubes is arranged on the back surface side as observed from the display screen of the chassis 1. The backlight 12 is supported by supporting members 11 affixed to the chassis 1.

An optical sheet 13 for uniformly diffusing and polarizing light from the backlight 12 is arranged more closely to the display surface side than the backlight 12. The optical sheet 13 is made up from a diffusion sheet, a prism sheet, a polarizing sheet or the like. The fixing structure by which the optical sheet 13 is affixed to the chassis 1 shall be explained in greater detail later. In addition, a liquid crystal display panel 14 serving as a display screen is arranged on a surface side of the optical sheet 13 and is affixed to the chassis 1.

Figure 2:
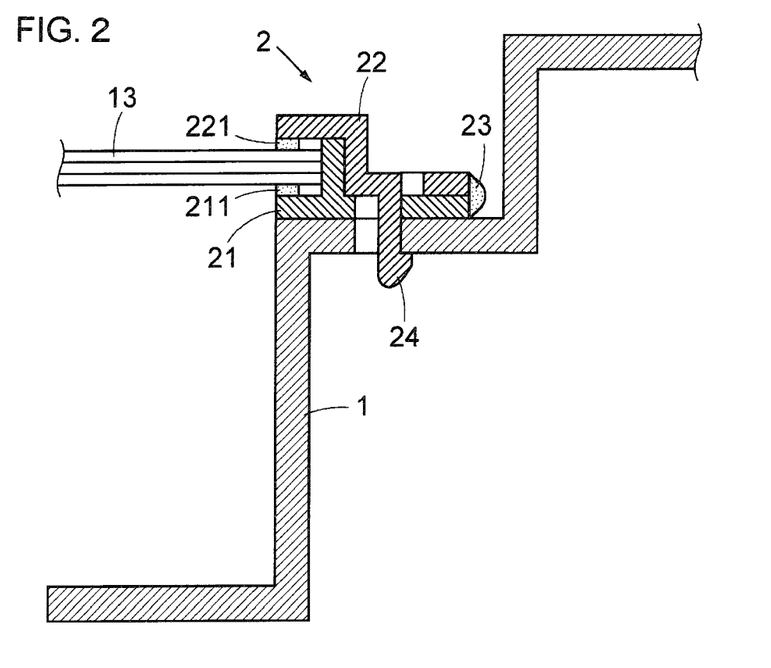
FIG. 2 is a view showing a state in which an optical sheet 13 is fixed and retained on the chassis 1 by a retaining tool 2.
Figure 3:
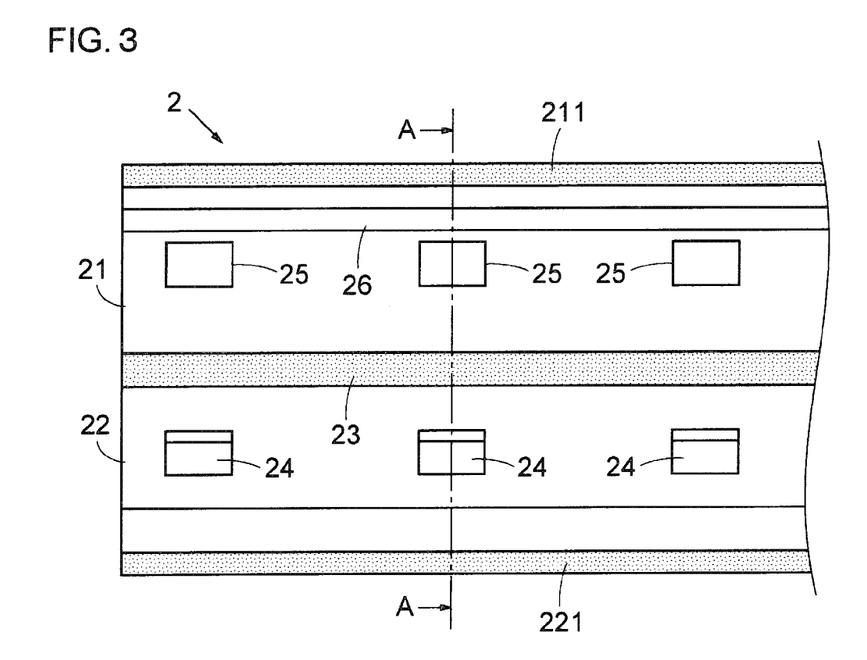
FIG. 3 is a view showing an opened state of the retaining tool 2.
Figure 4:
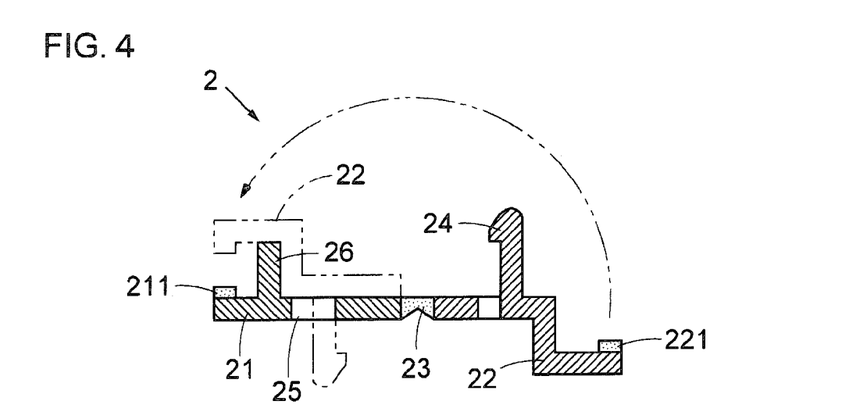
FIG. 4 is a cross sectional view of the retaining tool 2 as viewed from the arrows A-A in the FIG. 3.

Next, an explanation shall be made concerning the retaining tool 2 that serves to fix the optical sheet 13 to the chassis 1. FIG. 2 is a view showing a state in which an optical sheet 13 is fixed and retained on the chassis 1 by the retaining tool 2. Further, FIG. 3 is a view showing an opened state of the retaining tool 2, whereas FIG. 4 is a cross sectional view of the retaining tool 2. FIG. 4 is a cross sectional view as viewed from the arrows A-A in FIG. 3.

The retaining tool 2 comprises a first retaining piece 21 and a second retaining piece 22, which are interconnected. As shown in FIGS. 3 and 4, the first retaining piece 21 and the second retaining piece 22, which are made up from a hardened resin (e.g., and ABS resin or the like), are connected and joined by a bearing section 23 made of a soft material elastomer. Joining of the hardened resin and the elastomer may be carried out by a well-known bonding method (for example, bonding by an adhesive or by heat sealing). As shown by the two-dot-dash lined arrow in FIG. 4, the second retaining piece 22 can be rotated about the bearing section 23 with respect to the first retaining piece 21. The second retaining piece 22 shown by the two-dot-dashed line in FIG. 4 is shown in a rotated state thereof. In addition, as shown in FIG. 2, the optical sheet 13 can be retained by the retaining tool 2 and thereby fixed to the chassis 1.

A first retaining part 211 formed from an elastomer is fixed onto the inner side end of the first retaining piece 21, and a second retaining part 221 formed from an elastomer is fixed onto the inner side end of the second retaining piece 22. As discussed previously, fixing of the hardened resin with the elastomer may be carried out by a well-known bonding method (for example, bonding by an adhesive or by heat sealing). The optical sheet 13 is sandwiched between and gripped by the first retaining part 211 and the second retaining part 221. Because the first retaining part 211 and the second retaining part 221 are formed from a soft elastomer material, an excessive gripping force does not act on the optical sheet 13, and secure retention with high friction of the optical sheet 13 can be performed at an appropriate gripping force.

A latching and fixing section 24 is provided upstanding on the second retaining piece 22. Further, a through hole 25 is provided on the first retaining piece 21 through which the latching and fixing section 24 can penetrate. As shown in FIG.

2, the latching and fixing section 24 penetrates through the through hole 25, and by latching of a claw on the end of the latching and fixing section 24 onto a peripheral edge of a hole provided in the chassis 1, the first retaining piece 21 and the second retaining piece 22 are urged in the gripping direction, and together therewith, the retaining tool 2 is fixed to the chassis 1. More specifically, the latching and fixing section 24 is equipped with dual functions, both as a latching section for latching the optical sheet 13 in a gripped state by the first retaining part 211 and the second retaining part 221, and as a fixing section for fixing the retaining tool 2 to the chassis 1.

Further, a stopper 26 is disposed upstanding on the first retaining piece 21. By abutment of the stopper 26 against the second retaining piece 22, the interval between the first retaining piece 21 and the second retaining piece 22 is held at an appropriate value, for retaining the optical sheet 13 by an appropriate and suitable gripping force. The stopper 26 does not act on the optical sheet 13 at an excessive gripping force, and the optical sheet 13 can be retained by a suitable gripping force.

In this manner, the optical sheet 13 can be retained evenly at a suitable and balanced gripping force by the retaining tool 2. The retaining operation of the optical sheet 13 by the retaining tool 2 is carried out by a simple operation, merely by sandwiching the optical sheet 13 between the first retaining part 211 and the second retaining part 221, and pressing the second retaining piece 22 onto the chassis. Further, operations for taking out the optical sheet 13 as well can be performed easily, merely by releasing the engagement between the claw at the end of the latching and fixing section 24 and the chassis 1.

The retaining tool 2 is formed with lengths conforming appropriately to the four sides of the optical sheet 13, respectively. The four sides of the optical sheet 13 are fixed to the chassis 1 by four retaining tools 2. In the case of a small scale display device, the optical sheet 13 may be retained and fixed on two confronting sides thereof only, by two retaining tools 2. Further, the retaining tools 2 can be manufactured by injection molding. In particular, by two-color injection molding the elastomer parts and the hardened resin parts can be fusion bonded together and manufactured efficiently.

Figure 5:
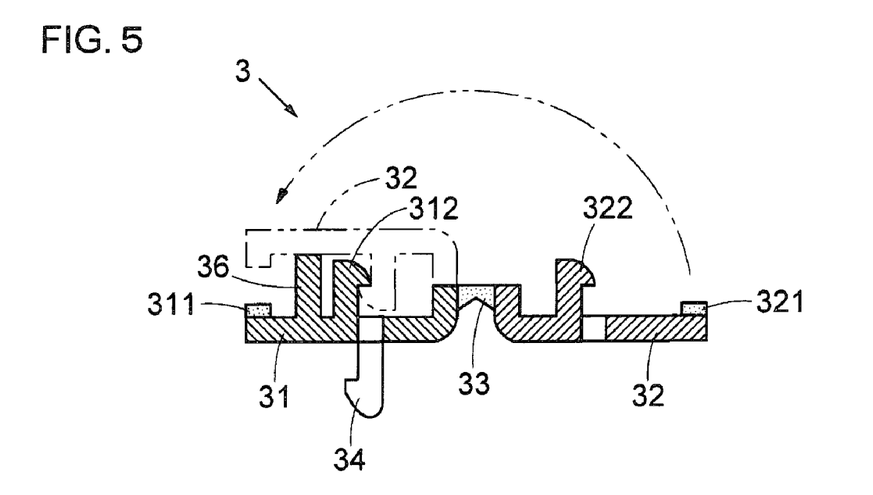
FIG. 5 is a view showing an opened state of another retaining tool 3 according to a second embodiment.
Figure 6:
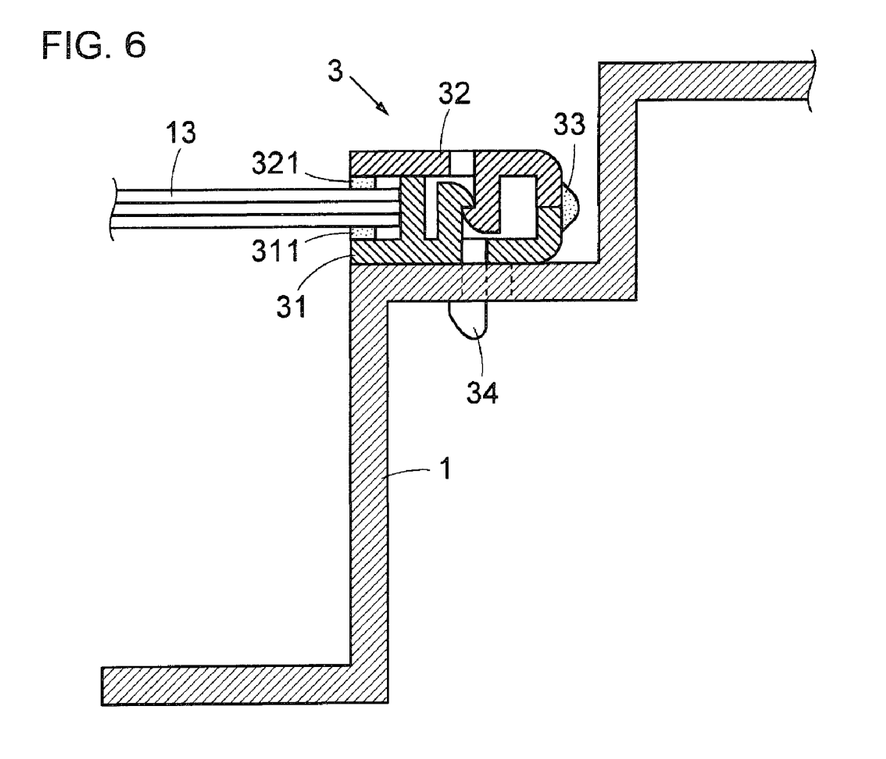
FIG. 6 is a view showing a state in which an optical sheet 13 is fixed and retained on the chassis 1 by the retaining tool 3.

Next, a retaining tool 3 according to a second embodiment shall be described. FIG. 5 is a view showing an opened state of the retaining tool 3 according to the second embodiment. In addition, FIG. 6 is a view showing a state in which an optical sheet 13 is fixed and retained on the chassis 1 by the retaining tool 3. The retaining tool 3, similar to the retaining tool 2, also has a structure in which a first retaining piece 31 and a second retaining piece 32 are connected to each other. As shown in FIG. 5, the first retaining piece 31 and the second retaining piece 32 are made of a hardened resin (e.g., an ABS resin), and are joined and connected together by a bearing section 33 made up from a soft elastomer. Joining of the hardened resin and the elastomer may be carried out by any well known bonding method.

As shown by the two-dot-dash lined arrow in FIG. 5, the second retaining piece 32 can be rotated about the bearing section 33 with respect to the first retaining piece 31. The second retaining piece 32 shown by the two-dot-dashed line in FIG. 5 is shown in a rotated state thereof. In addition, as shown in FIG. 6, the optical sheet 13 can be retained by the retaining tool 3 and thereby fixed to the chassis 1.

A first retaining part 311 formed from an elastomer is fixed onto the inner side end of the first retaining piece 31, and a second retaining part 321 formed from an elastomer is fixed onto the inner side end of the second retaining piece 32. The optical sheet 13 is sandwiched between and gripped by the first retaining part 311 and the second retaining part 321. Because the first retaining part 311 and the second retaining part 321 are formed from a soft elastomer material, an excessive gripping force does not act on the optical sheet 13, and secure retention with high friction of the optical sheet 13 can be performed at an appropriate gripping force.

A first latching section 312 is provided upstanding on the inside of the first retaining piece 31. A second latching section 322 is provided upstanding on the inside of the second retaining piece 32. As shown in FIG. 6, claws on end portions of the first latching section 312 and the second latching section 322 are capable of engagement with each other, for urging the first retaining piece 31 and the second retaining piece 32 in the gripping direction and latching the retaining pieces together. Further, a fixing section 34 is provided upstanding on the first retaining piece 31. As shown in FIG. 6, through engagement of a claw on an end of the fixing section 34 with an edge of a hole provided in the chassis 1, the retaining tool 3 is fixed to the chassis 1.

Further, a stopper 36 is disposed upstanding on the first retaining piece 31. By abutment of the stopper 36 against the second retaining section 32, the interval between the first retaining section 31 and the second retaining section 32 is held at an appropriate value, for retaining the optical sheet 13 by an appropriate and suitable gripping force. The stopper 36 does not act on the optical sheet 13 at an excessive gripping force, and the optical sheet 13 can be retained by a suitable gripping force.

The condition under use of the retaining tool 3 is the same as that of the retaining tool 2. Four sides of the optical sheet 13 may be retained by the retaining tools 3, or the optical sheet 13 may be retained and fixed on two confronting sides thereof only. Further, the retaining tool 3 can be manufactured by injection molding. In particular, by two-color injection molding the elastomer parts and the hardened resin parts can be fusion bonded together and manufactured efficiently.

Figure 7:
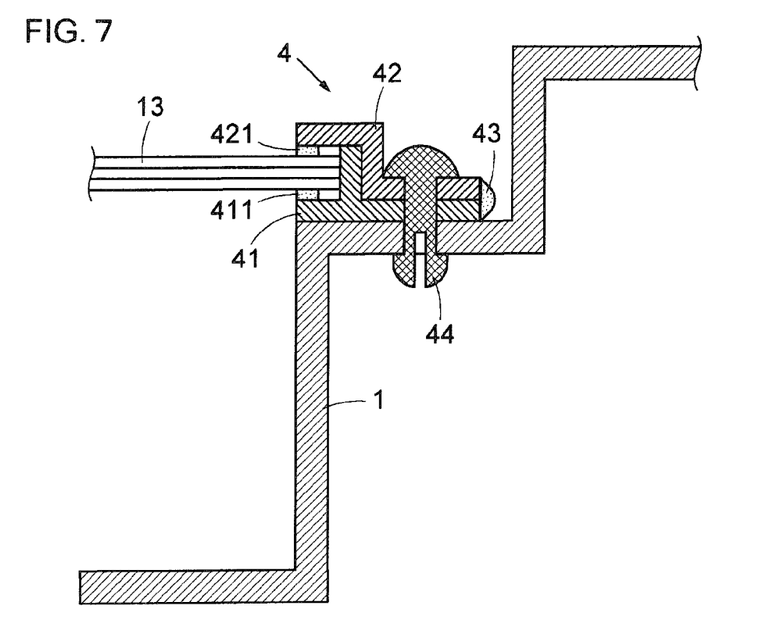
FIG. 7 is a view showing a state in which the optical sheet 13 is fixed and retained on the chassis 1 by another retaining tool 4 according to a third embodiment.

Next, a retaining tool 4 according to a third embodiment shall be described. FIG. 7 is a view showing a state in which the optical sheet 13 is fixed and retained on the chassis 1 by the retaining tool 4 according to a third embodiment. The retaining tool 4, similar to the retaining tools 2 and 3, also has a structure in which a first retaining piece 41 and a second retaining piece 42 are connected to each other. Specifically, the first retaining piece 41 and the second retaining piece 42 are made of a hardened resin (e.g., an ABS resin), and are joined and connected together by a bearing section 43 made up from a soft elastomer.

The second retaining piece 42 can be rotated about the bearing section 43 with respect to the first retaining piece 41. In addition, as shown in FIG. 7, the optical sheet 13 can be retained and fixed to the chassis 1 by the retaining tool 4. A first retaining part 411 formed from an elastomer is fixed onto the inner side end of the first retaining piece 41, and a second retaining part 421 formed from an elastomer is fixed onto the inner side end of the second retaining piece 42. The optical sheet 13 is sandwiched between and gripped by the first retaining part 411 and the second retaining part 421. Functions of the first retaining part 411, the second retaining part 421, and the stopper disposed on the first retaining piece 41, etc., are the same as those of the retaining tools 2 and 3.

Through holes are formed in the first retaining piece 41 and the second retaining piece 42. By insertion of a latching and fixing pin 44 in the through holes, and further by engagement of a claw on an end portion of the latching and fixing pin 44 onto the edge of a hole provided on the chassis 1, the first retaining piece 41 and the second retaining piece 42 are urged in the gripping direction, and the retaining tool 4 is fixed to the chassis 1. More specifically, the latching and fixing pin 44 is equipped with dual functions, both as a latching section for latching the optical sheet 13 in a gripped state by the first retaining part 411 and the second retaining part 421, and as a fixing section for fixing the retaining tool 4 to the chassis 1.

Further, although the retaining tool 4 can be manufactured by two-color injection molding similar to the aforementioned embodiments, the retaining tool 4 also can be manufactured by extrusion molding. The first retaining piece 41 and the second retaining piece 42 are manufactured by cutting the molded product formed by extrusion molding to a suitable length, and the through holes are provided by subsequent processing thereafter. The members made from elastomer are affixed thereto by bonding or the like, thus enabling manufacturing of the retaining member 4. Furthermore, in the case of manufacturing by extrusion molding, by utilizing two-color extrusion molding, the hardened resin and the elastomer can be subjected to extrusion molding simultaneously, and can be integrally fusion bonded to each other. For the latching and fixing pin 44, manufacturing by a separate injection molding step or the like is utilized.

Figure 8:
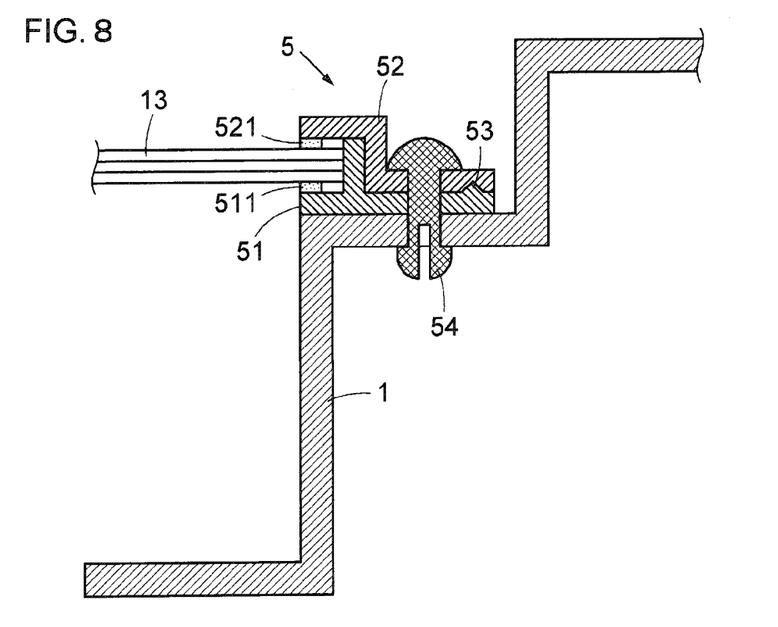
FIG. 8 is a view showing a state in which the optical sheet 13 is fixed and retained on the chassis 1 by another retaining tool 5 according to a fourth embodiment.

Next, a retaining tool 5 according to a fourth embodiment shall be described. FIG. 8 is a view showing a state in which the optical sheet 13 is fixed and retained on the chassis 1 by the retaining tool 5 according to the fourth embodiment. The retaining tool 5 is roughly the same as the aforementioned retaining tool 4, except that the structure of the bearing member 53 is different. In the retaining tool 5, the first retaining piece 51 and the second retaining piece 52 are not connected together by an elastomer, but rather, the first retaining piece 51 and the second retaining piece 52 are mutually independent from each other. A projection is formed on an edge portion of the first retaining piece 51, and the projection makes up the bearing section 53. The positional relationship of the first retaining piece 51 and the second retaining piece 52 is preserved by the bearing section 53.

As shown in FIG. 8, the optical sheet 13 can be fixed to the chassis 1 by the retaining tool 5. A first retaining part 511 formed from an elastomer is fixed onto the inner side end of the first retaining piece 51, and a second retaining part 521 formed from an elastomer is fixed onto the inner side end of the second retaining piece 52. The optical sheet 13 is sandwiched between and gripped by the first retaining part 511 and the second retaining part 521. Functions of the first retaining part 511, the second retaining part 521, and the stopper disposed on the first retaining piece 51, etc., are the same as those of the retaining tools 2, 3 and 4.

Through holes are formed in the first retaining piece 51 and the second retaining piece 52. By inserting a latching and fixing pin 54 in the through holes, and further by engagement of a claw on an end portion of the latching and fixing pin 54 onto the edge of a hole provided on the chassis 1, the first retaining piece 51 and the second retaining piece 52 are urged in the gripping direction, and the retaining tool 5 is fixed to the chassis 1. Functioning of the latching and fixing pin 54 is the same as that of the latching and fixing pin 44 of the retaining tool 4.

Further, although the retaining tool 5 can be manufactured by two-color injection molding similar to the aforementioned embodiments, the retaining tool 5 also can be manufactured by extrusion molding. The first retaining piece 51 and the second retaining piece 52 are manufactured by cutting the molded product formed by extrusion molding to a suitable length, and the through holes are provided by subsequent processing thereafter. The members made from elastomer are affixed thereto by bonding or the like, thus enabling manufacturing of the retaining member 5. Furthermore, in the case of manufacturing by extrusion molding, by utilizing two-color extrusion molding, the hardened resin and the elastomer can be subjected to extrusion molding simultaneously, and can be integrally fusion bonded to each other. For the latching and fixing pin 54, manufacturing by a separate injection molding step or the like is utilized.

As described above, the optical sheet 13 can be retained more evenly with an appropriate and equal gripping force by the retaining tools 2 to 5. The retaining tool is formed at a suitable length conforming to the four sides, respectively, of the optical sheet 13. The four sides of the optical sheet 13 may be affixed to the chassis 1 by four retaining tools, or in the case of a small scale display device, the optical sheet 13 may be retained and fixed on only two confronting sides thereof by two retaining tools.

Figure 9:
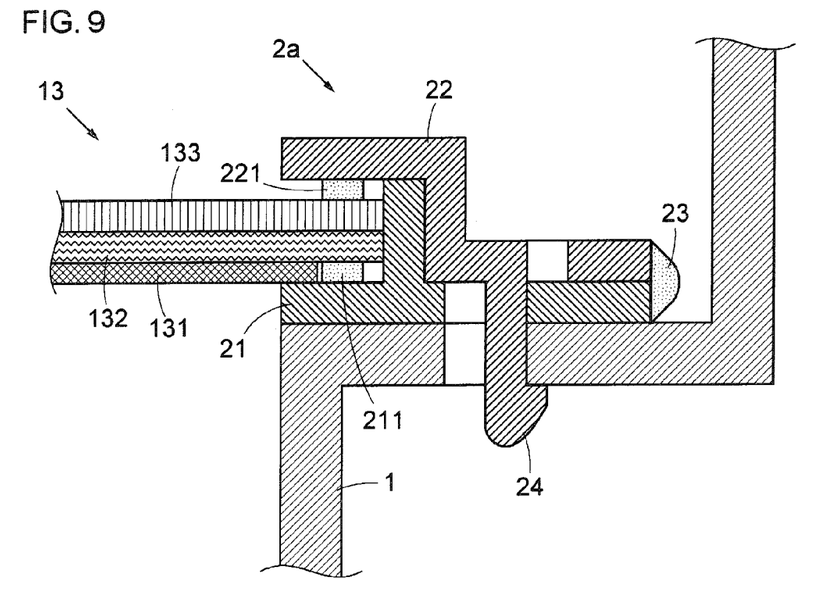
FIG. 9 is a view showing a modified example of a configuration for retaining the optical sheet 13 by the retaining tool.

Next, a modified example of a configuration for retaining the optical sheet 13 by the retaining tool shall be explained. FIG. 9 is a view showing such a modified example. The optical sheet 13 is retained by the retaining tool 2a and fixed to the chassis 1. Herein, the optical sheet 13 comprises a stack made up from plural laminated layers of a light diffusion sheet 131, a prism sheet 132, and a polarizing sheet 133. The layering structure and order of the layers of the optical sheet 13 is not limited to the configuration shown in the figures. Different layering structures and/or different ordering of the layers may be adopted.

The structure of the retaining tool 2a is roughly the same as that of the retaining tool 2 of FIG. 2, except that the positions of the first retaining part 211 of the first retaining piece 21 and the second retaining part 221 of the second retaining piece 22 are different. The first retaining part 211 is affixed at a position moved a predetermined distance toward the side of the bearing section 23 from the tip end portion of the first retaining piece 21, and the second retaining part 221 is affixed at a position moved the same distance toward the side of the bearing section 23 from the tip end portion of the second retaining piece 22.

On the optical sheet 13 for this case, the mechanical strength of the light diffusion sheet 131 at the lowermost layer is considerably weaker than that of the other layers. With this type of condition, even if the three layers taken together are gripped by the first retaining part 211 and the second retaining part 221, sufficient retention strength cannot be obtained. Rather, the retention force can be made larger by excluding the light diffusion sheet 131 and gripping the other two layers. Also, a sufficient tensile force is imparted to the optical sheet 13 and the flatness of the optical sheet 13 can be improved.

Accordingly, a predetermined width is excluded from the edge of the light diffusion sheet 131 layer, while the other two layers (the prism sheet 132 and the polarizing sheet 133) are gripped by the first retaining part 211 and the second retaining part 221. The light diffusion sheet 131 is excluded from gripping by the first retaining part 211 and the second retaining part 221. Owing thereto, the optical sheet 13 can be retained at a sufficient retention force, and an adequate tensile force can be imparted to the optical sheet 13.

Further, it is desirable for the light diffusion sheet 131, which has been excluded from gripping, to be affixed to an inner surface on the end portion of the first retaining piece 21 by bonding or the like. As a result of fixing the light diffusion sheet 131 to the first retaining piece 21, a sufficient tensile force can be imparted also to the light diffusion sheet 131. In the case that the light diffusion sheet 131 is laminated onto the other sheets, and a sufficient tensile force can be imparted thereto by such lamination, it is not strictly necessary for the light diffusion sheet 131 to be affixed to the first retaining piece 21.

Although a case has been described in which a layer of the optical sheet 13 on the side of the first retaining piece 21 is excluded upon gripping the optical sheet 13, a case in which a layer on the side of the second retaining piece 22 is excluded upon gripping also is acceptable. Furthermore, a case in which layers on both sides are excluded upon gripping also is acceptable. Further, concerning the retaining tool as well, although descriptions have been made based on the structure of the retaining tool 2, the features thereof are the same based on any of the retaining tools 2 through 5.

Figure 18:
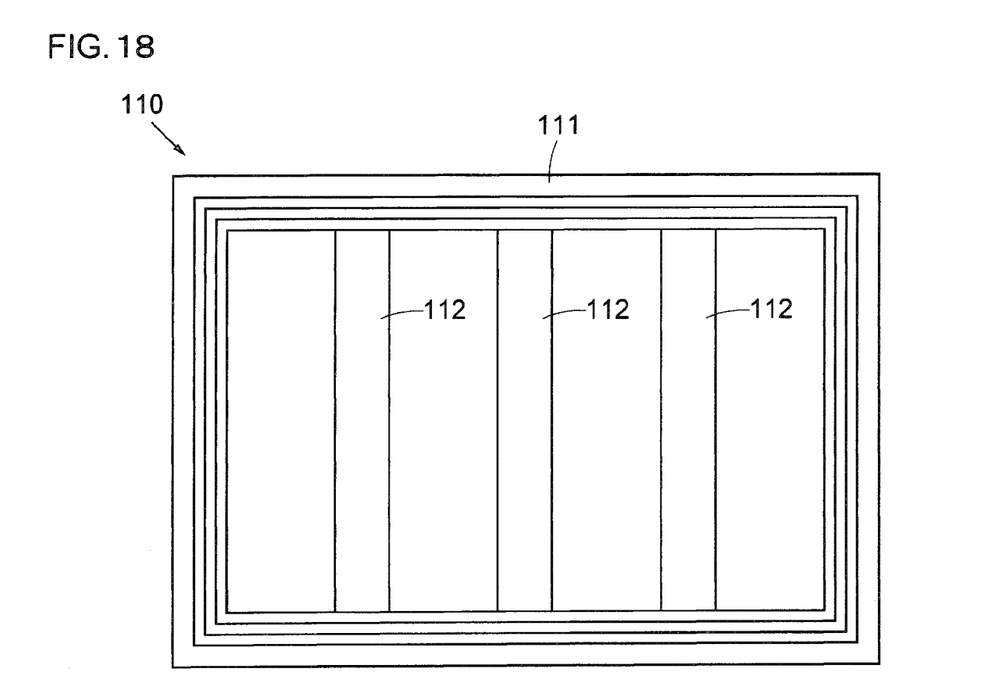
FIG. 18 is a view showing the structure of a prior art chassis 110.

Next, the structure and manufacturing method of a chassis for use with a liquid crystal display device according to the present invention shall be described with reference to the drawings. First of all, a prior technique on which the chassis structure for a large-scale flat panel display device is based shall be explained. FIG. 18 is a view showing the structure of a prior art chassis 110. In FIG. 18, the chassis 110 for a large-scale flat panel display device is viewed from the side of the screen thereof. A chassis frame 111 is made by carrying out a punching process on a large-sized sheet metal material, in which a large portion at the center thereof is punched out, resulting in a frame shape. Further, a stepped shape is formed by a press-forming step. The cross sectional configuration of the chassis frame 111 is similar to the cross sectional configuration of the chassis 1 shown in FIG. 1.

Further, a reinforcing beam member 112 is affixed to the chassis frame 111 as shown. The chassis frame 111 and the beam member 112 are fixed together by means of welding, clamping with screws, or the like. Various components of the large-scale flat panel display are installed on or within the chassis 110. For this case, an example shall be described of a large-scale liquid crystal display device in which a liquid crystal display panel is used.

With the chassis frame 111 of the large-scale flat panel display device, a large sized sheet metal material must also be used, and the central core that results when the center portion of the sheet metal material is punched out also becomes proportionately large in size. When the chassis is manufactured, the core is processed as unnecessary scrap material, however, the occurrence of such large sized scrap material itself gives rise to problems of material costs. Further, problems also occur in that costs must be expended in the processing of such scrap materials. Given this factor, with the present invention, a technique is applied by which the metallic structural members and a thermoplastic resin are integrated, such that a lightweight and high strength chassis frame for a large-scale flat panel display device can be manufactured efficiently from materials.

Figure 10:
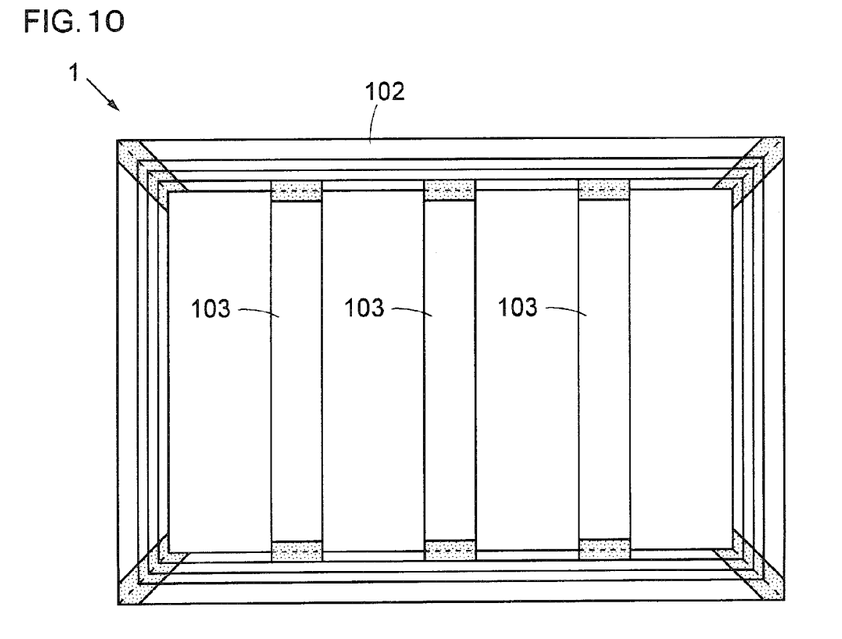
FIG. 10 is a view showing the structure of the chassis 1 according to the present invention.

FIG. 10 is a view showing the structure of the chassis 1, constituted by a chassis frame 102 manufactured according to the manufacturing method of the present invention. The chassis frame 102 is not an integrally constructed molded product, as with the chassis frame 111 shown in FIG. 18. Frame members constituting the upper, lower, left and right sides are joined at corner portions thereof. Concerning such joining, a thermoplastic resin is joined to the metallic frame members, and at the same time, the frame members themselves are joined to each other. Details of the joining method shall be described later. In this manner, because the frame members making up four sides are joined to each other, thereby forming the chassis frame 102, a large central portion is not punched out and material waste can be significantly reduced.

A plurality of beam members 103 are affixed to the chassis frame 102 for providing reinforcement and for supporting installed components. The fixing method of the chassis frame 102 and the beam members 103, similar to the joining of the frame members, involves joining by means of injection molding of a thermoplastic resin. Joining of all of the fixed locations can be performed at the same time by insert molding, and such joining can be carried out in a short time, resulting in a manufacturing method that is suited to mass production.

Figure 11:
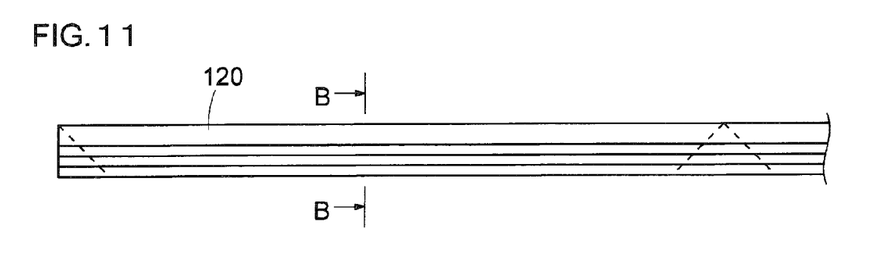
FIG. 11 is a view showing an extruded material 120.
Figure 12:
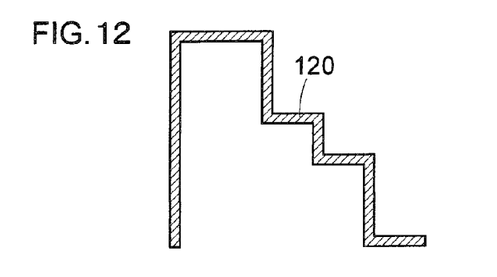
FIG. 12 is a cross sectional view showing the structure in cross section of the extruded material 120.

An aluminum alloy extruded material 120 can be utilized for the frame members constituting the chassis frame 102. FIG. 11 is a view showing an extruded material 120. The cross sectional shape of the extruded material 120 is as shown in FIG. 12. FIG. 12 is a cross sectional view as seen from the arrows B-B in FIG. 11. The extruded material 120 is cut along the dotted lines, as shown in FIG. 11, to thereby make each of the frame members.

Figure 13:
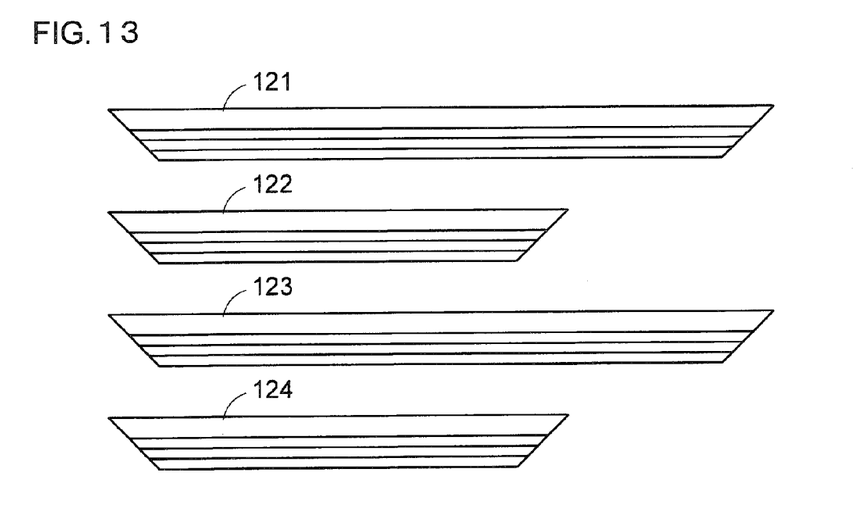
FIG. 13 is a view showing frame members 121 to 124 which have been cut from the extruded material 120.

FIG. 13 is a view showing respective frame members 121 to 124 which have been cut from the extruded material 120. The frame member 121 makes up an upper side, the frame member 122 makes up a right side, the frame member 123 makes up a lower side, and the frame member 124 makes up a left side. As shown in FIG. 13, each of the frame members 121 to 124 can easily be fabricated simply by cutting at a 45° angle, with respect to the longitudinal direction of the extruded material 120.

Figure 14:
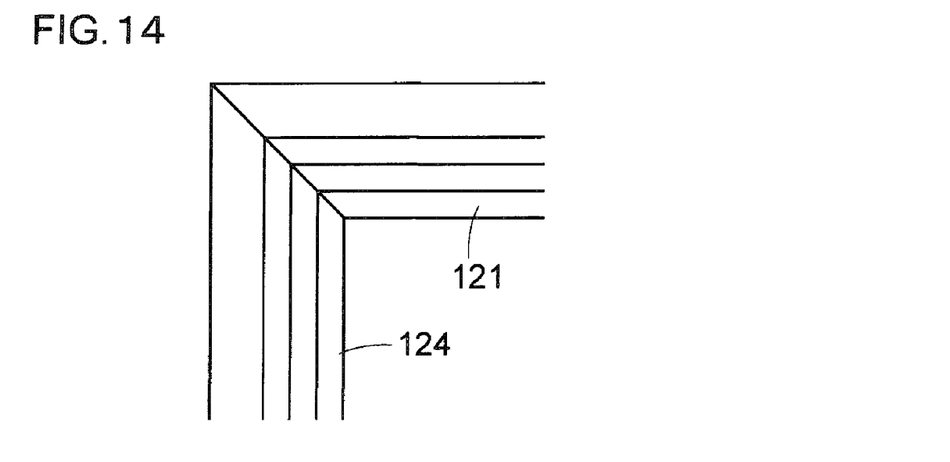
FIG. 14 is a view showing a state in which the frame members are assembled together with each other.
Figure 15:
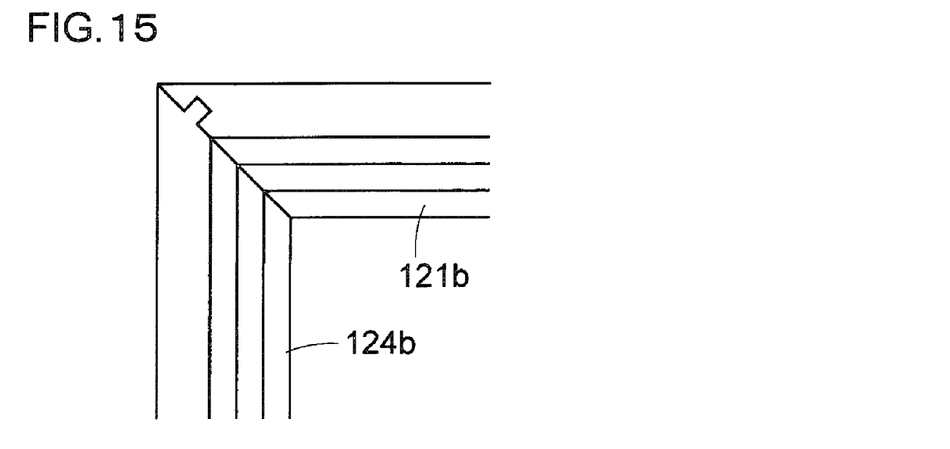
FIG. 15 is a view showing a state in which the frame members are assembled with each other in another configuration.

FIG. 14 is a view showing a state in which the frame members are assembled together with each other. The members, which have been cut simply at a 45° angle as shown in FIG. 13, are assembled as shown in FIG. 14. As another assembly structure, mutually engaging convex and convex shapes may be formed on abutting surfaces of the frame members, which are assembled together as shown in FIG. 15. With the frame members 121b, 124b assembled in this manner, it is difficult for the positions of the abutting portions to be shifted, and the joining strength thereof can be made stronger. However, even with the abutting surface shapes such as shown in FIG. 14, adequate positional accuracy and strength can be obtained. Conditions for assembling the other frame members to each other are the same.

As materials for the frame members 121 to 124, although an aluminum alloy extruded material 120 is preferred, a molded product made from a magnesium alloy or the like can be used. If possible, materials are preferable which have a coefficient of linear expansion that is as near as possible to the coefficient of linear expansion of the adjoined thermoplastic resin.

Figure 16:
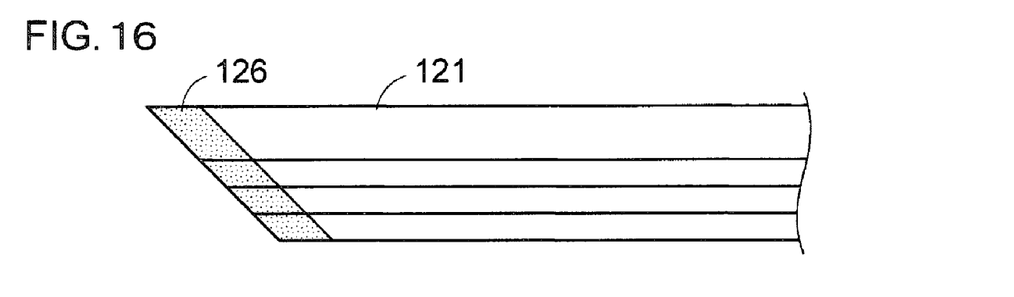
FIG. 16 is a view showing adjoining surfaces 126 in the vicinity of abutting parts of the frame members 121.

Adjoining surfaces in the vicinity of the abutting portions of the frame members 121 to 124 are formed with a plurality of fine recesses therein by means of a surface treatment. FIG. 16 is a view showing adjoining surfaces 126 in the vicinity of abutting parts of frame members 121. The surface treatment can easily be carried out by immersing the adjoining surfaces 126 for a predetermined time in a corrosive liquid (a corrosive aqueous solution, a corrosive suspension). Preferably, the adjoining surfaces 126 are covered entirely by fine recesses or openings having an average inside diameter of 10 to 80 nm.

For example, with an A5052 aluminum alloy (JIS standard), in the case that a water soluble amine solution is adjusted to be weakly basic on the order of PH10, and the aluminum alloy is immersed therein at 40° C., recesses having an average diameter of 20 to 40 nm are generated instantly, and in approximately one minute, the depth reaches a level roughly equal with the inner diameter. If immersion is continued further, the depth of the recesses becomes all the more deeper, and the edge portions formed by the recesses collapse as well, at which point the average inside diameter grows larger and larger.

When the surface of an A5052 piece, which has been immersed for about 20 minutes and then cleaned in water and dried, is observed under an electron microscope, the average inside diameter of the recesses as seen from the surface become as large as 80 to 100 nm. According to an experiment in which a PPS type resin was injected onto an A5052 aluminum alloy for joining the same, the bonding strength rapidly decreased under a condition in which the average inside diameter of the recesses exceeded 80 nm. Specifically, with chemical etching by which A5052 aluminum alloy pieces are immersed in a weakly basic aqueous solution, as the average inside diameter borders on roughly 80 nm, the joining strength by injection joining decreases rapidly.

When metallic corrosion progresses to a degree where the average inside diameter of the recesses exceed 80 nm, the strength of the surface composition of the metal becomes weakened, which may be considered as causing a decrease in the bonding strength. In light of these experimental results, it is preferable to carry out a surface treatment to a degree such that the average inside diameter of the fine recesses is within a range of 10 to 80 nm. With a surface treatment by immersion in a corrosive liquid, the immersion time is adjusted, such that the average inside diameter of the fine recesses occurs within the range of 10 to 80 nm.

FIG. 16 is a view showing an adjoining surface 126 in the vicinity of an abutting part of the frame member 121. A surface treatment is carried out on the adjoining surface 126 by immersion for a predetermined time in a corrosive liquid (a corrosive aqueous solution, a corrosive suspension), so that a condition results in which the surface is covered by multiple fine recesses. The treatment time is set so that the average inside diameter of the fine recesses becomes 10 to 80 nm. In the figure, only the adjoining surface 126 of one end of the frame member 121 is shown, however, another adjoining surface 126 on which the same surface treatment has been carried out also is formed on the other end portion thereof. Further, adjoining surfaces on both ends of the other frame members 122 to 124, and the adjoining surfaces where the frame members 121, 123 and the beam members 103 are joined together also are subjected to the same surface treatment.

Although it is acceptable for a surface treatment to be carried out only on the adjoining surfaces in the vicinity of where the frame members 121 to 124 and the beam members 103 are joined to each other, a surface treatment also may be carried out in which the frame members 121 to 124 and the beam members 103 are immersed entirely in the corrosive liquid and the entire surfaces thereof are treated. It is preferable that the surface treatment be carried out at least on the adjoining surfaces, in the vicinity of the adjoined portions.

Figure 17:
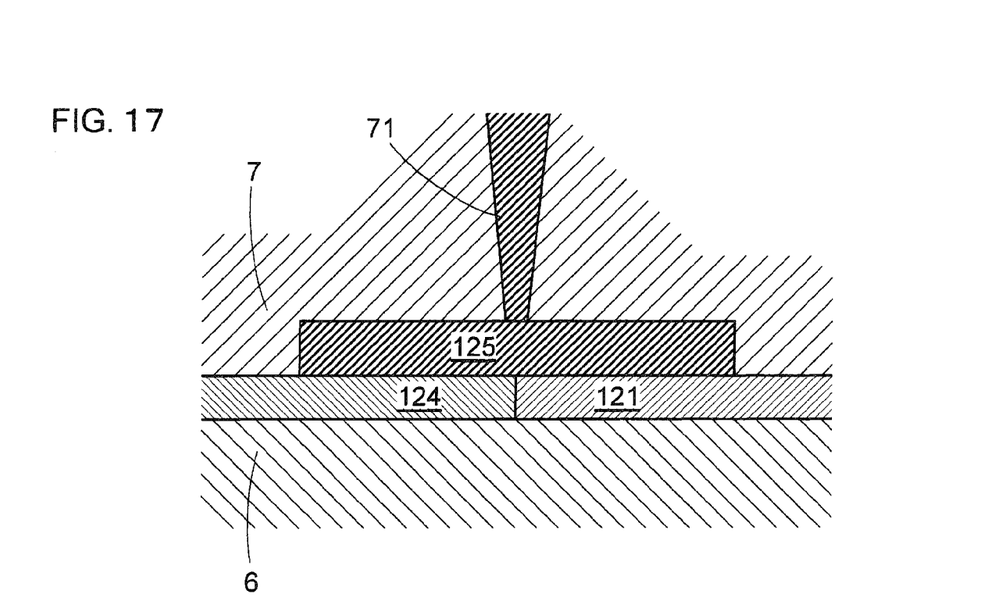
FIG. 17 is a view showing joined portions of frame members 121, 124 in an injection molding process.

Each of the members on which the surface treatment was carried out to form fine recesses on the adjoining surfaces thereof are inserted into a mold, and injection molding of a thermoplastic resin is performed, such that the respective members are firmly joined to each other owing to the strong bond between the respective members and the resin. FIG. 17 shows joined portions of frame members 121, 124 in an injection molding process. The frame members 121, 124 are inserted into the molds 6, 7 in a state of abutment. A gate 71 is formed on the side of the mold 7, in the vicinity of the abutting portions of the frame members. A thermoplastic resin 125 is injected from the gate 71, which is firmly bonded onto the adjoining surfaces 121, 124 of the frame members. As a result, the frame members 121, 124 are firmly joined to one another. Adjoining portions of the other members are treated in the same manner.

At the same time that each of these types of members are joined together, it is desirable that each type of the supporting parts, retaining structures and the like be formed by injection molding of a thermoplastic resin onto the frame members 121 to 124 and the beam members 103. For example, the supporting parts and retaining structures for the backlight, liquid crystal display panel and the like can be formed. At positions where forming is performed on each of the members, adjoining surfaces are provided, which are joined by the thermoplastic resin. A condition is prepared in which these adjoining surfaces are covered by a plurality of fine recesses, having an average inside diameter of 10 to 80 nm, by means of a surface treatment in the same manner as described previously.

Although in FIG. 17, an example is shown in which the frame members 121, 124 are arranged in abutment, it is not strictly necessary that each of these members be arranged in contact with each other. It also is acceptable for each of the members to be arranged in close proximity to each other. In the case that the respective members are arranged in close proximity, the thermoplastic resin flows into a gap between each of the members, such that the respective members are firmly joined together. In this case, adjoining surfaces, in which fine recesses are formed by a surface treatment, also are provided on the facing surfaces in the gap between each of the members.

It is desirable for the thermoplastic resin, which is injected onto the adjoining surfaces of the members for joining the same, to be a crystalline resin. In the case of a crystalline resin, the bonding strength between the resin and each of the metallic members increases significantly. As examples of such a crystalline thermoplastic resin, resins made up primarily of polybutylene terephthalate (PBT) or polyphenylene sulfide (PPS) may be given.

The injection molding process shown in FIG. 17 shall be explained. First, the molds 6, 7 are opened, and metallic members having the aforementioned adjoining surfaces provided thereon are inserted into one of the molds. The molds 6, 7 are closed, and a thermoplastic resin composition material having a resin component including 70 to 99 percent-by-weight of a PPS type resin and 30 to 1 percent-by-weight of an polyolefin type resin is injected. After hardening, the molds are opened and separated, whereby the chassis frame 102 and the chassis 1 are manufactured.

As a characteristic of the injection conditions in the present invention, molten resin at a high temperature comes into contact with the inserted metallic components. In this sense, the invention differs slightly from a general injection molding process. That is, it is desirable for the temperature of the molds to be somewhat elevated. More specifically, a temperature of 100° C. or greater is preferable, and a temperature of 120° C. or greater is even more preferable. On the other hand, the injection temperature, injection pressure, and injection speed are not changed especially from those of ordinary injection molding.

Summarizing the respective processes of the manufacturing method for the chassis as described above, the following processes (1) to (3) are involved:

(1) a process of severing the extruded material 120 and thereby forming the frame members 121 to 124;

(2) a process of carrying out a surface treatment on the resin-adjoined parts of the frame members 121 to 124, thereby forming adjoining surfaces made up of plural fine recesses having an average inside diameter of 10 to 80 nm; and (3) a process of inserting the frame members 121 to 124 into an injection forming mold, and injecting a thermoplastic resin onto adjoining surfaces of the frame members 121 to 124 to join the four frame members integrally to each other.

By manufacturing the chassis frame 102 by these processes, since the parts that result in extraneous materials can be significantly reduced, material costs and cost associated with treatment of scrap materials can be reduced, and the manufacturing costs for the chassis can be dramatically reduced. Further, because a die is used whereby the frame members are joined together integrally by injection molding, mass production techniques can be enabled, whereby the manufacturing costs can be even further reduced.

In the above explanations, an example has been described of a case in which a liquid crystal panel is used as a large-scale flat panel display device. However, the chassis of the present invention is not limited to large-scale flat panel display devices using liquid crystal panels. The invention can be applied to devices using plasma display panels or other optional types of display panels.

INDUSTRIAL APPLICABILITY

According to the retaining tool of the present invention, the optical sheet can be retained with an appropriate and even gripping force by the retaining tool. Because the retaining operation for the optical sheet is simplified, the product quality of liquid crystal display devices can be improved, together with reducing manufacturing costs. Further, according to the chassis of the present invention, because the chassis frame is produced by integrally joining metallic frame members that make up four sides, parts that become extraneous materials are dramatically reduced, material costs and costs associated with handling of scrap material are reduced, thereby enabling the manufacturing costs for the chassis to be significantly reduced. Further, because the frame members are joined together integrally by injection molding using a die assembly, it is possible to carry out mass production, and thus manufacturing costs can be even further reduced.

The invention claimed is:

1. An optical sheet retaining tool for a liquid crystal display device, comprising:
   a first retaining piece (21) having a first retaining part (211) made of a soft material for retaining an optical sheet (13) for a liquid crystal display device;
   a second retaining piece (22) having a second retaining part (221) made of a soft material capable of being arranged in opposition to said first retaining part (211), for gripping and retaining said optical sheet (13) in cooperation with said first retaining part (211);
   a latching section (24) for latching said first retaining part (211) and said second retaining part (221) under a state in which said optical sheet (13) is gripped therebetween;
   a fixing section (24) for retaining and fixing said first retaining piece (21) and said second retaining piece (22) to a chassis (1) of said liquid crystal display device; and
   a bearing section (23) disposed on at least one of said first retaining piece (21) and said second retaining piece (22), and serving as a bearing for gripping said optical sheet (13).

2. An optical sheet retaining tool for a liquid crystal display device according to claim 1, wherein said bearing section (23) is made up from an elastomer that mutually connects said first retaining piece (21) and said second retaining piece (22) together.

3. An optical sheet retaining tool for a liquid crystal display device according to claim 1, wherein said bearing section (53) comprises a projection formed on at least one of said first retaining piece (51) and said second retaining piece (52).

4. An optical sheet retaining tool for a liquid crystal display device according to claim 1, wherein said latching section (24) and said fixing section (24) are formed as a single latching and fixing section (24).

5. An optical sheet retaining tool for a liquid crystal display device according to claim 1, wherein said first retaining part (211) and said second retaining part (221) are formed from an elastomer.

6. An optical sheet retaining tool for a liquid crystal display device according to claim 1, further comprising a stopper (26) that maintains an interval between said first retaining piece (21) and said second retaining piece (22) at an appropriate value for retaining said optical sheet (13).

7. An optical sheet retaining tool for a liquid crystal display device according to claim 1, wherein
   said optical sheet (13) comprises a laminated stack having a plurality of layers, and
   one or more layers of said optical sheet (13) are excluded from being gripped by said first retaining part (211) and said second retaining part (221).

8. An optical sheet retaining tool for a liquid crystal display device according to claim 7, wherein the layer that is excluded from gripping of the optical sheet (13) is anchored onto either said first retaining piece (21) or said second retaining piece (22).

9. A chassis for a liquid crystal display device comprising a chassis frame (102) onto which the optical sheet retaining tool for a liquid crystal display device according to any one of claims 1 to 8 is assembled,
   said chassis frame (102) being manufactured by:
   a step of forming metal frame members (121 to 124) forming four sides of a substantially rectangular shaped chassis frame (102);
   a surface treatment step in which a surface treatment is performed on surfaces at least in the vicinity of adjoining portions of said frame members (121 to 124), to thereby form a plurality of fine recesses therein and create adjoining surfaces (126); and
   an injection bonding step of placing four of said frame members (121 to 124) mutually in contact with or in close proximity to each other so as to be arranged in the shape of said chassis frame (102), and injecting a thermoplastic resin onto said adjoining surfaces (126) over two of said frame members (121 to 124), which have been brought into contact or placed in close proximity, on respective joined parts thereof, and coupling four of said frame members (121 to 124) integrally to form said chassis frame (102).

10. A chassis for a liquid crystal display device according to claim 9, wherein, in said surface treatment step, said frame members (121 to 124) are immersed in a corrosive liquid and etching is performed thereon, and surface treatment is carried out such that an average inside diameter of said fine recesses is within a range of 10 to 80 nm.

11. A chassis for a liquid crystal display device according to claim 10, wherein said thermoplastic resin used in said injection bonding step is a resin made up primarily of polybutylene terephthalate or polyphenylene sulfide.

12. A chassis for a liquid crystal display device according to claim 11, wherein, in said injection bonding step, said frame members (121 to 124) are inserted into injection forming molds (6 and 7), and said thermoplastic resin (125) is injected onto said adjoining surfaces (126) to perform joining thereof.

13. A chassis for a liquid crystal display device according to claim 12, wherein said frame members (121 to 124) are composed of an aluminum alloy.

* * * * *